E. N. BOWEN.
TRANSMISSION GEARING.
APPLICATION FILED JUNE 9, 1909. RENEWED JULY 22, 1913.
1,088,398.
Patented Feb. 24, 1914.
2 SHEETS—SHEET 1.
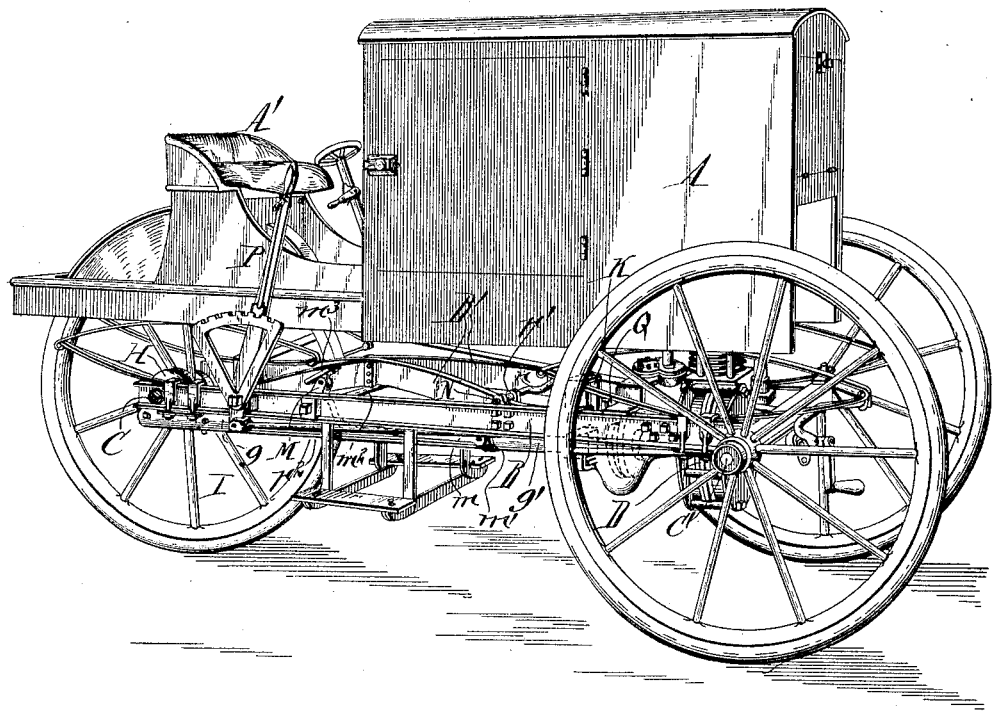
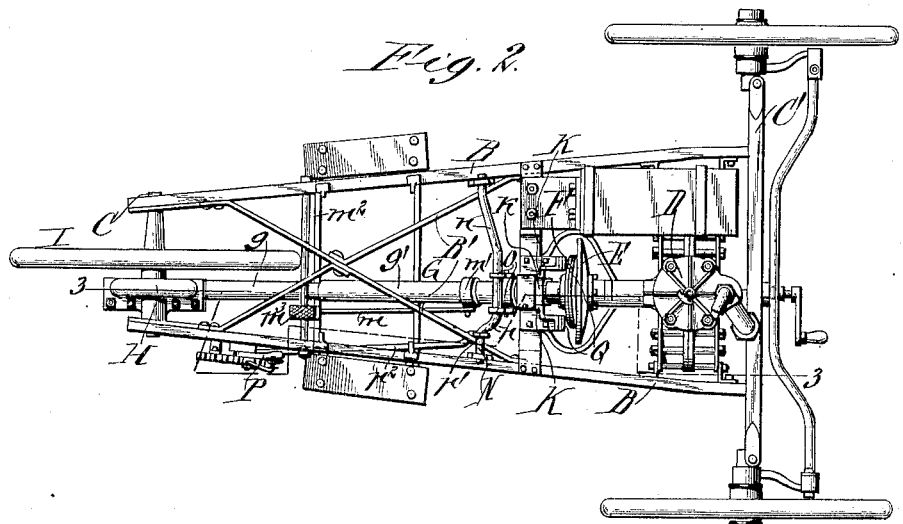

E. N. BOWEN.
TRANSMISSION GEARING.
APPLICATION FILED JUNE 9, 1909. RENEWED JULY 22, 1913.
1,088,398.
Patented Feb. 24, 1914.
2 SHEETS—SHEET 2.
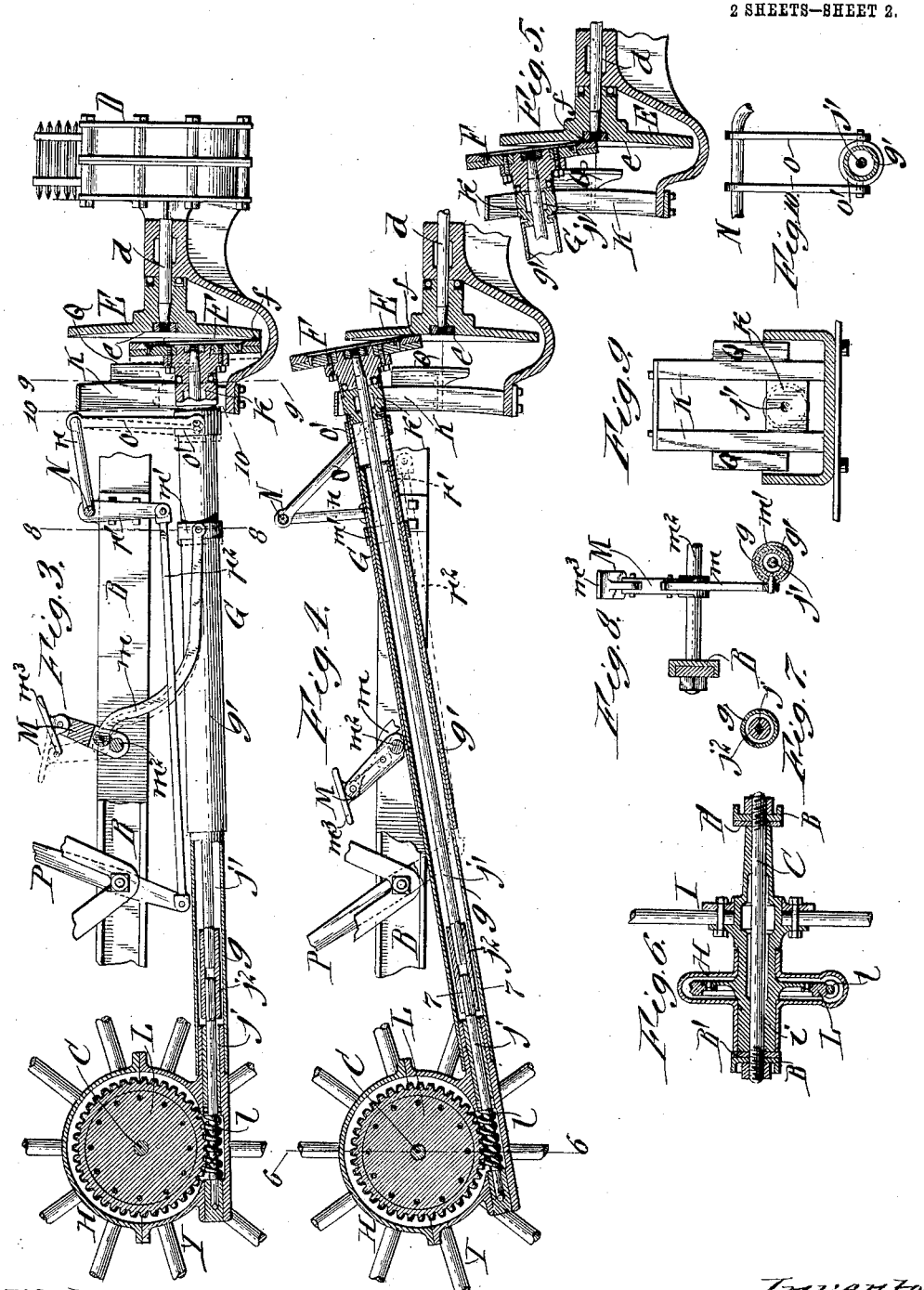

UNITED STATES PATENT OFFICE.

EPHRAIM N. BOWEN, OF BUFFALO, NEW YORK, ASSIGNOR TO AUTO-TRI MANUFACTURING COMPANY, OF BUFFALO, NEW YORK, A CORPORATION OF NEW YORK.

TRANSMISSION-GEARING.

1,088,398. Specification of Letters Patent. Patented Feb. 24, 1914.

Application filed June 9, 1909, Serial No. 501,063. Renewed July 22, 1913. Serial No. 780,575.

*To all whom it may concern:*

Be it known that I, EPHRAIM N. BOWEN, a citizen of the United States, residing at Buffalo, in the county of Erie and State of New York, have invented a new and useful Improvement in Transmission-Gearing, of which the following is a specification.

This invention relates to a transmission gearing of the frictional type which is suitable for various uses, but designed more especially for automobiles.

The improvement has more particular reference to the type of gearing in which the driving and driven wheels or disks are arranged face to face or in nearly parallel planes, so that the side-edge of the driven wheel is in frictional engagement with the side of the driving wheel, as distinguished from gearing of this class in which the driving and driven members stand in planes substantially at right angles to each other. Frictional gearing of the first-mentioned character has the advantage over the second-named type of producing little or no grinding or so-called "cross-action," but as hitherto constructed, the contact surfaces of the driving and driven members are comparatively small, thus requiring the application of considerable force in order to avoid undue slippage of the frictionally-engaged wheels and consequent loss of power.

It is one of the objects of my invention to improve the construction of frictional transmission gears of the first-mentioned type above described, with a view of increasing the contact surface between the driving and driven wheels, thus enabling them to be held in frictional engagement with correspondingly less exertion on the part of the operator, while retaining the advantage of minimizing the grinding or cross action incident to such gears.

A further object is to so arrange the members of the transmission gearing that the contact area between the driving and driven wheels is greatest in the position for reversing the driven wheel, in order to reduce grinding and wear of the wheels to a minimum in the latter position.

Another object is to combine with the transmission gearing a brake of a simple and reliable construction, for retarding or stopping the driven part when the coöperating wheels of the transmission gearing are separated.

In the accompanying drawings consisting of 2 sheets: Figure 1 is a perspective view of a motor car or automobile embodying the invention. Fig. 2 is a top plan view thereof, with the body and seat removed. Fig. 3 is a fragmentary sectional elevation of the vehicle, on an enlarged scale, the plane of the sectional portion being on line 3—3, Fig. 2. Figs. 4 and 5 are similar sections showing different positions of the driven wheel. Figs. 6 and 7 are transverse sections on lines 6—6 and 7—7, Fig. 4. Figs. 8, 9 and 10 are transverse sections on the correspondingly-numbered lines in Fig. 3.

Similar letters of reference indicate corresponding parts throughout the several views.

The motor car shown in the drawings is a three-wheeled vehicle designed for delivering merchandise and has a suitable body A and a seat $A^1$ in rear thereof. These parts are mounted upon the frame or chassis which in the example illustrated, comprises longitudinal channel bars B connected by diagonal braces $B^1$.

C, $C^1$ indicate the front and rear axles suitably secured to the chassis.

D indicates a motor of any approved construction, and $d$ the driving or motor shaft, which parts are suitably supported on the chassis. When the transmission gearing is applied to a motor car, the driving shaft is arranged lengthwise thereof, as shown. To the rear end of this shaft is secured a wheel or disk E preferably having a concave side or face $e$, and constituting the driving member of the transmission gearing.

F indicates a driven wheel or disk arranged to face the concave side $e$ of the driving wheel and adapted to bear with its side-edge or marginal portion $f$ against said concave face to receive rotary motion therefrom. The driving shaft $d$ terminates at or short of the concave face of the wheel E, and the driven disk is movable across said face, so that upon shifting the driven wheel laterally toward or from the axis of the driving wheel on one side of the driving shaft, the relative speed of the driven wheel is diminished or increased without changing its direction of rotation, while upon shifting the driven wheel beyond the driving shaft, its motion is reversed in an obvious manner.

The bearing face $f$ of the driven wheel preferably consists of leather or other suitable compressible material which spreads under pressure and increases the contact area between the wheels. The driven wheel is carried by a swinging arm or frame G which, in the preferred construction shown in the drawings, is formed with or rigidly secured to a hub or gear case H mounted to oscillate upon the hub $i$ of the rear vehicle-wheel I, as seen in Fig. 6, although said hub or gear case could obviously be mounted directly upon the rear axle C. The arm G is preferably arranged tangentially to its hub H, or in other words, at an angle to a line drawn through the center of the rear axle and the axis of the driven wheel. By this arrangement, the angle between the opposing contact sides of the driving and driven wheels is increased as the driven wheel is shifted from its lowest or high-speed position, shown in Fig. 3, to the "reverse" position shown in Fig. 4, with the result that the contact-area between the side of the driving wheel and the edge or corner of the driven wheel is widest in the high-speed adjustment and narrowest in the "reverse" position. Grinding and wear of the wheels in the last-named position is thus correspondingly reduced, while the most favorable position for power transmission at high and intermediate speeds is obtained.

In the construction shown in the drawings, the carrying arm G consists of telescopic tubes $g$, $g^1$, the rear one $g$ of which is secured to the lower side of the gear-case H. Within these tubes is incased the shaft of the driven wheel, which shaft consists of sections $j$, $j^1$, the front one of which is slidable endwise relatively to the other. These shaft sections are coupled to turn together by a sleeve $j^2$ having a square or angular bore which receives the correspondingly-shaped inner ends of the shaft-sections, so that the front shaft-section is capable of following the telescopic movements of the corresponding tube $g^1$. The latter carries at its front end a suitable bearing $k$ for the front shaft-section $j^1$, to which latter the driven wheel is secured. The free end of the arm G is steadied in its vertical movements by upright guides K which are secured to a fixed part of the chassis and between which the flat-sided bearing $k$ slides, as best shown in Fig. 9.

The rear shaft-section $j$ is journaled in a bearing carried by the gear-case H and is provided with a worm $l$ meshing with a worm wheel L fastened to the hub of the rear wheel I, as shown in Figs. 3, 4 and 6. This extensible construction of the carrying arm G and shaft $j$, $j^1$, permits the driven wheel to be moved into and out of engagement with the driving wheel. In the construction shown, this movement is effected by a vertically-swinging foot lever M connected by a link $m$ with a collar $m^1$ secured to the outer tube $g^1$ of the arm G. The foot lever is pivoted to a transverse rod $m^2$ mounted on the chassis and is preferably provided with a rocking foot-plate $m^3$ which adapts itself to the position of the foot, permitting backward as well as forward pressure to be exerted upon the lever to withdraw or advance the driven wheel.

Any suitable mechanism may be employed for shifting the driven wheel to change its speed or reverse its motion. The devices illustrated in the drawings comprise a transverse crank shaft N journaled on the chassis above the front portion of the carrying arm G and having forwardly-extending arms $n$ which are connected by depending links $o$ with a collar $o^1$ secured to the front end of the outer telescopic tube $g^1$. This crank shaft is rocked by a vertically-swinging hand lever P pivoted to the chassis and connected with a depending arm $p^1$ of the crank shaft by a rod $p^2$. By this arrangement, the driven wheel can be moved vertically across the concave face of the driving wheel, in an obvious manner, and by the use of the foot lever M, it can be forced against the driving wheel with greater or less pressure, as required. When the driven wheel is shifted to the position shown in Fig. 3, the vehicle is driven forward at the maximum speed, the speed being diminished by shifting it upwardly from that position. When said wheel is moved to the position shown in Fig. 5, with its edge in contact with the center of the driving wheel, the latter imparts no motion thereto, but on the contrary, acts as a brake, while when the driven wheel is shifted upwardly beyond that position, as shown in Fig. 4, its motion is reversed.

By concaving the face of the driving wheel, the contact surface between it and the driven wheel is increased, especially in the high-speed and intermediate-speed adjustments, enabling the wheels to be held in proper frictional engagement with correspondingly less force or exertion.

Q, Q indicate brake shoes or surfaces arranged adjacent to the back of the driven wheel, so as to be frictionally engaged by its rear side when it is withdrawn from the driving wheel, as indicated by dotted lines in Fig. 3. In the construction illustrated in the drawings, these brake-shoes are located on opposite sides of the path of the carrying arm G and fastened to the front sides of the guides K. The faces of the brake-shoes are preferably concentric with the concave face of the driving wheel, and are arranged to fully clear the driven wheel when in its normal or projected position.

While the driven wheel when shifted to the position shown in Fig. 5, acts as an efficient brake, it is desirable in some cases to provide the separate brake composed of the shoes Q and the back of the driven wheel.

Various devices may obviously be employed for adjusting the driven wheel and moving it toward and from the driving wheel, and I do not therefore wish to be limited to the particular shifting means herein shown and described.

I claim as my invention:—

1. In a transmission gearing, the combination of a driving wheel having a concave face, a tubular telescopic carrying member pivoted to swing across said concave face, a shaft carried by said telescopic member, a driven wheel mounted on said shaft and adapted to engage frictionally with said driving wheel, and means for actuating the telescopic member to shift the driven wheel crosswise of the driving wheel and toward and from the same.

2. In a transmission gearing, the combination of a driving wheel, a tubular telescopic member facing the same and pivoted to swing at its free end across the side-face thereof, an extensible shaft arranged in said telescopic member, a driven wheel secured to said shaft and arranged to engage with its side-edge against the side-face of the driving wheel, and means for actuating the telescopic member to shift the driven wheel crosswise of the driving wheel and toward and from the same.

3. In a transmission gearing, the combination of driving and driven wheels arranged with their side-faces in frictional engagement, a pivot, and a swinging support for the driven wheel mounted on said pivot and arranged tangentially to a circle about the pivot.

4. In a transmission gearing, the combination of driving and driven wheels arranged with their side-faces in frictional engagement, and a pivoted support carrying the driven wheel and movable across the side-face of the driving wheel, said support being arranged at an angle to a line passing through its pivot and the center of the driven wheel.

5. In a transmission gearing, the combination of driving and driven wheels arranged with their side-faces in frictional engagement, a pivot, a hub mounted on said pivot, and a supporting arm carrying the driven-wheel and secured tangentially to said hub.

6. In a transmission gearing, the combination of driving and driven wheels arranged with their side-faces in frictional engagement, the driven wheel being movable toward and from the driving wheel, an element having a brake-surface arranged adjacent to the back of the driven wheel, and means for shifting the driven wheel into engagement with either the driving wheel or said brake-surface.

7. In a transmission gearing, the combination of driving and driven wheels arranged with their side-faces in frictional engagement, the side-face of the driving wheel being concave and the driven wheel being movable toward and from said face, and a brake shoe arranged adjacent to the back of the driven wheel and having its face curved concentrically with the concave face of the driving wheel.

Witness my hand this 5th day of June, 1909.

EPHRAIM N. BOWEN.

Witnesses:
C. F. GEYER,
W. S. BULL.